United States Patent [19]

Brown

[11] Patent Number: 4,494,515

[45] Date of Patent: Jan. 22, 1985

[54] METHOD FOR MIXING GASEOUS FUEL WITH AIR

[75] Inventor: M. Wayne Brown, Orem, Utah

[73] Assignee: IPT Corporation, Provo, Utah

[21] Appl. No.: 515,935

[22] Filed: Jul. 20, 1983

Related U.S. Application Data

[62] Division of Ser. No. 284,042, Jul. 17, 1981, Pat. No. 4,399,795.

[51] Int. Cl.³ ............................................. F02B 43/00
[52] U.S. Cl. .................................... 123/527; 123/575; 261/16; 48/180 R
[58] Field of Search .................... 123/527, 575, 276 E; 48/180.1; 261/16

[56] References Cited

U.S. PATENT DOCUMENTS 2,067,595  1/1937  Browne et al. .................... 123/527
4,306,519 12/1981  Schoenhard ..................... 123/25 A Primary Examiner—E. Rollins Cross
Attorney, Agent, or Firm—Curtis, Morris & Safford

[57] ABSTRACT

A system and method for mixing gaseous fuel with air prior to combustion in an internal combustion engine. The system includes an L-shaped channel with a cap mounted to one end and an inlet formed at the other end. A plurality of holes is formed in the L-shaped channel. The channel is mounted to the air intake system of the internal combustion engine upstream from the air filter such that a partial vacuum is created in the vicinity of the holes as the incoming air flows past the channel. The channel includes means for regulating the flow of gaseous fuel through the channel.

6 Claims, 8 Drawing Figures

METHOD FOR MIXING GASEOUS FUEL WITH AIR

This is a division of application Ser. No. 284,042 filed July 17, 1981 now U.S. Pat. No. 4,399,795.

BACKGROUND

1. Field of the Invention

The present invention relates to a system and method for mixing gaseous fuel with air, and more particularly, to a system and method for mixing gaseous fuel with air in a dual fuel system of an internal combustion engine.

2. Prior Art

Various types of carburetors have been developed for internal combustion engines to solve the basic problem of mixing liquid gasoline fuel with air to provide a combustible fuel/air mixture. Problems inherent in the carburetion of liquid fuels have led many to explore gaseous fuels, such as propane, as an alternative to conventional gasoline or diesel fuels. Thus, many different carburetors or mixers have been developed for gaseous fuel systems.

Much development has occurred particularly in the area of "conversion kits" for gaseous fuel mixers which are adapted for installation in the gasoline fuel carburetion system of an ordinary internal combustion engine. These so-called conversion kits are intended to provide a dual fuel systen which will permit operation of the engine on liquid fuel alone, gaseous fuel alone, and in some systems, combinations of the two fuels.

The prior art gaseous fuel mixers can be generally classified into three categories based on the type of installation within the combustion engine: (1) mixers which are installed between the intake manifold and the carburetor; (2) mixers which are installed directly inside of or around the carburetor; and (3) mixers which are installed within or adjacent the air filter housing so as to release gaseous fuel inside the air filter.

Generally speaking, each of these types of gaseous fuel mixers is difficult to install. The desired connections are often congested with throttle linkage, choke linkage, vacuum hoses, fuel lines, valve lines, and the like. Moreover, typically the prior art type fuel mixers require complicated adjustments in order to adapt them to the characteristics of a particular combustion engine.

Another common installation problem is that portions of the original engine equipment must be replaced or modified to accommodate installation of the prior art type mixers. As a result, time-consuming modifications must be made to the engine. For example, often it occurs that a gaseous fuel mixer cannot be used with the existing air intake system of the combustion engine. This necessitates providing the mixer with a vacuum-creating device or pressurizing the gaseous fuel before injection into the air flow to obtain an adequate fuel/air mixture. Also, prior art fuel mixers of the third type, those releasing gaseous fuel inside the air filter, are commonly connected to a gaseous fuel line through the top of the air filter housing. Such fuel line connections frequently require modification of the car hood to accommodate the gaseous fuel lines.

Another significant problem experienced with the prior art type fuel mixers is that proper mixing of the gaseous fuel with the air flowing into the combustion engine is difficult to achieve. The basic problem is how to combine the fuel and air particles into a homogeneous mixture. An important factor in achieving a homogeneous mixture of fuel and air is the path of the air flow in relation to the entry of the gaseous fuel into the air flow. In nearly every internal combustion engine, the air flow is irregular between the air filter and the engine cylinders, and since most prior art fuel mixers use the existing air flow system of the internal combustion engine, some of the engine cylinders receive a richer gaseous fuel/air mixture than other cylinders. Thus, to compensate, the rate of gaseous fuel injection into the air flow is increased so that combustion will still occur within the cylinders receiving the leanest air/fuel mixture. By adjusting the rate of fuel flow to provide the leanest cylinder with an optimum air/fuel mixture, the other cylinders consequently receive a richer air/fuel mixture than is necessary for combustion, resulting in wasted fuel and poor engine efficiency. This problem is compounded by the fact that in many cases, the very installation of the prior art type gaseous fuel mixers tends to render the incoming air flow more irregular.

A further problem of nearly every prior art type mixer is that additional gaseous fuel is wasted during acceleration of the engine due to the effect of the engine vacuum during the air response delay between the engine cylinders and the air inlet of the air intake system. Typically, when a driver depresses the accelerator pedal of his vehicle to accelerate the engine, a series of butterfly valves in the carburetor are opened to allow more fuel/air mixture to enter the cylinders, thus increasing the power output of the engine. Upon opening these valves, the air flow within and immediately around the carburetor is suddenly exposed to a vacuum created by the engine pistons. The influence of the vacuum is transferred back through the engine's air flow system until satisfied by the incoming air that is drawn through the air intake. With the prior art type mixers, this momentary vacuum imposed on the prior art type mixers causes additional fuel to exit the fuel mixing device and mix with the air flow, thus yielding a gaseous fuel/air mixture which is considerably richer than the optimum mixture needed for combustion. As a result, the excess gaseous fuel injected into the air flow is wasted. And when the air filter of the internal combustion engine is dirty or becomes wet, the air flow is further impeded and even more gaseous fuel is wasted due to a longer air response delay during acceleration.

In view of the foregoing, what is needed in the art is a gaseous fuel mixer for a dual fuel system of an internal combustion engine that overcomes these and other problems of the prior art, and yet is economical and simple to construct and install.

BRIEF SUMMARY AND OBJECTS OF THE INVENTION

The present invention relates to a system and method for mixing gaseous fuel with air for subsequent combustion in a dual fuel internal combustion engine. The gaseous fuel mixer includes a channel with a cap mounted to one end and an inlet formed at the other end thereof. The gaseous fuel mixer is mounted to the air intake system of an ordinary internal combustion engine at a position before the air filter. The cap is positioned outside the air intake system so as to support the channel within the air intake system. The inlet is connected to a fuel line which is in communication with a gaseous fuel source.

The fuel line introduces gaseous fuel into the inlet at atmospheric pressure. A series of holes is formed in a portion of the channel and is situated within the air intake system so as to point downstream from the air flowing through the air intake system. As incoming air rushes past the holes formed in the channel, a partial vacuum is created near the holes, drawing the gaseous fuel from the channel into the air intake system. As the rate of air flow through the air intake system increases, the amount of gaseous fuel drawn through the holes into the air intake system increases proportionately. Thus, the ratio of gaseous fuel to air within the air intake system always remains essentially constant. An adjustable flow regulator mounted to the channel allows the user to adjust the flow of gaseous fuel into the channel.

It is, therefore, an object of the present invention to provide a gaseous fuel mixing system for mixing propane or other gaseous fuel in a dual fuel system of an internal combustion engine.

It is another object of the present invention to provide a gaseous fuel mixer which is quickly and easily installed into the air intake system of an internal combustion engine without elaborate modification of the existing engine system or cumbersome and time-consuming installation procedures.

Still another object of the present invention is to provide a gaseous fuel mixer which is inexpensive and of simple construction, requiring no precision machining in the manufacture thereof, and which is thus inexpensive and yet highly effective in achieving its intended result.

A further object of the present invention is to provide a gaseous fuel mixing system which achieves nearly perfect mixing of the gaseous fuel with air before the gaseous fuel/air mixture reaches the cylinders of the internal combustion engine.

Yet another object of the present invention is to provide a gaseous fuel mixing system which provides a constant fuel/air ratio irrespective of increased impedance to the air flow caused by the air filter and the cylinders of the engine system.

Still another important object of the present invention is to provide a gaseous fuel mixing system which achieves high fuel economy during the operation thereof.

Yet a further object of the present invention is to provide a highly effective method for mixing gaseous fuel with air in a dual fuel system of an internal combustion engine.

These and other objects and features of the present invention will become more fully apparent from the following description and appended claims taken in conjunction with the accompanying drawings.

DETAILED DESCRIPTION OF THE INVENTION

Reference is now made to the figures wherein like parts are designated by like numerals throughout.

Figure 1:
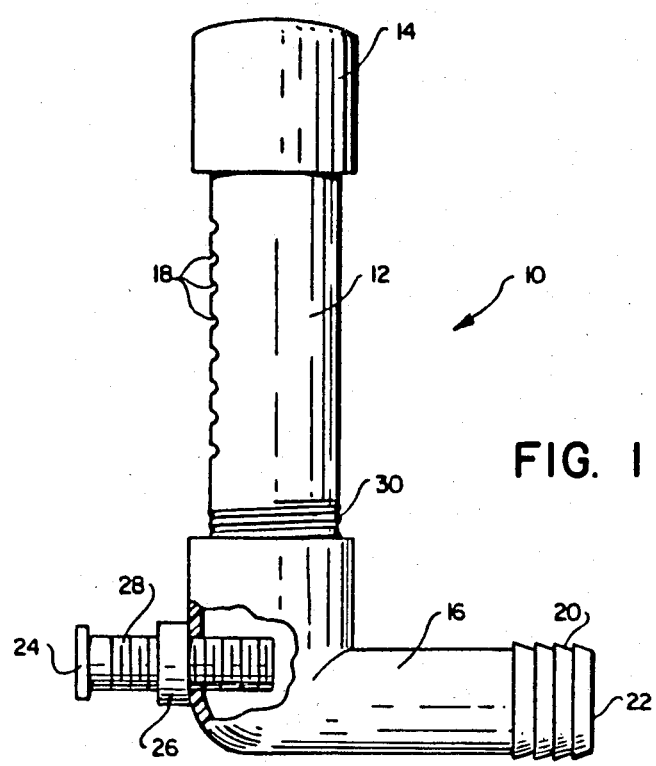
FIG. 1 is a side elevational view of one presently preferred embodiment of the present invention, with portions broken away to reveal interior construction.

A first preferred embodiment of the gaseous fuel mixer of the system of the present invention, generally designated 10, is illustrated in FIG. 1. The gaseous fuel mixer 10 includes a hollow L-shaped channel which is formed by connecting a first channel member 16 to a second channel member 12. Channel member 12 is attached to channel member 16 by a series of threads 30 formed in the lower end of channel member 12. A cap 14 is mounted to the upper end of channel member 12 by glue, epoxy, or other suitable means. First channel member 16, second channel member 12, and cap 14 can be formed from any material which is resistant to corrosion by the gaseous fuel, as for example, polyvinyl chloride (PVC), fiberglass, plastics, certain types of metals, ceramics, or epoxies.

A plurality of holes 18 are formed in the second channel member 12 as shown in FIG. 1. Holes 18 can be arranged in any desirable pattern; however, it has been found advantageous to arrange holes 18 in a single row so as to be diametrally opposite the surface of second channel member 12 which is first contacted by the air flow, as will be explained in more detail herein.

A gaseous fuel inlet 22 is formed in one end of first channel member 16. A series of ridges 20 is also formed near the end of first channel member 16 to provide an anchoring surface for a gaseous fuel line to be attached thereto.

An adjustable screw 24 is used to regulate the flow of gaseous fuel through first channel member 16, and subsequently, through second channel member 12. Adjustable screw 24 has a series of threads 28 for connection to the first channel member 16. A nut 26 is used to secure screw 24 to first channel member 16 at any desirable position. By adjusting the screw 24 the impedance within first channel member 16 may be increased or decreased so that the rate of gaseous fuel flowing through first channel member 16 can be correspondingly increased or decreased, thus regulating the flow of gaseous fuel through second channel member 12 and out holes 18.

Figure 2:
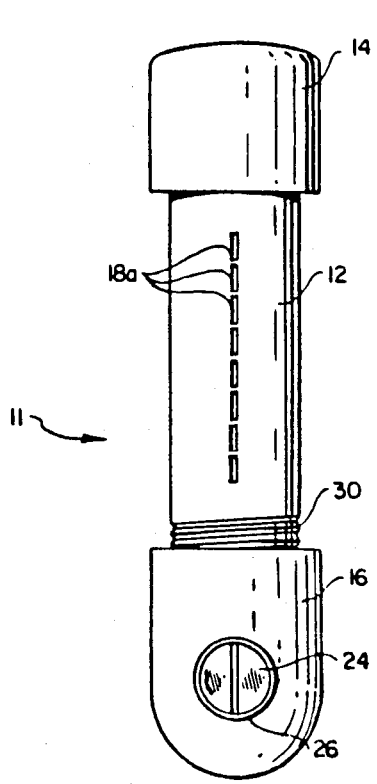
FIG. 2 is a front elevational view of a second preferred embodiment of the present invention.

A second preferred embodiment of the gaseous fuel mixer of the system of the present invention, generally designated 11, is illustrated in FIG. 2. This embodiment is identical to the embodiment of FIG. 1 except that the embodiment of FIG. 2 includes a plurality of rectangular holes or slits 18a formed in the second channel member 12. Slits 18a are illustrative of the various configurations which can be used to form the outlet in second channel member 12. Other suitable configurations could also be used, as for example, a continuous slit (not shown) extending the length of the area covered by slits 18a in FIG. 2. Thus, it will be appreciated that any number of configurations are possible in forming one or more outlets in second channel member 12 in implementing the inventive concepts of the present invention.

Figure 3:
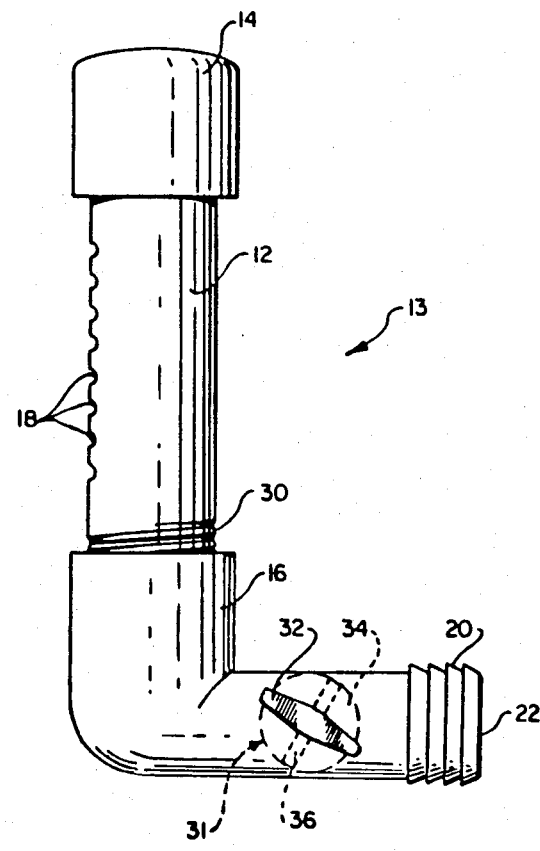
FIG. 3 is a side elevational view of a third preferred embodiment of the present invention.

A third preferred embodiment of the gaseous fuel mixer of the system of the present invention, generally designated 13, is shown in FIG. 3. This preferred embodiment is also identical to the embodiment of FIG. 1 except that instead of an adjustable screw 24 and position-fixing nut 26 to regulate the flow of gaseous fuel through first channel member 16, the embodiment of FIG. 3 includes a stopcock generally designated 31 to regulate the flow of gaseous fuel through first channel member 16. Stopcock 31 comprises a handle 32 and a rotatable member 34 having a bore 36 formed therein. Stopcock 31 is mounted to first channel member 16 such that stopcock handle 32 is disposed outside channel member 16 and rotatable member 34 is disposed within channel member 16. The diameter of rotatable member 34 corresponds to the diameter of first channel member 16. By turning stopcock handle 32, bore 36 can be positioned to increase or decrease the rate of gaseous fuel flowing through the first channel member 16, and subsequently through the second channel member 12. Maximum fuel flow is achieved by positioning bore 36 parallel with the walls of first channel member 16. Minimum fuel flow, or effectively no fuel flow, is accomplished by positioning bore 36 perpendicular to the walls of first channel member 16.

It will be appreciated that various other flow-regulating devices may be used in lieu of adjustable screw 24 of FIG. 1 or stopcock 31 of FIG. 3.

Figure 4:
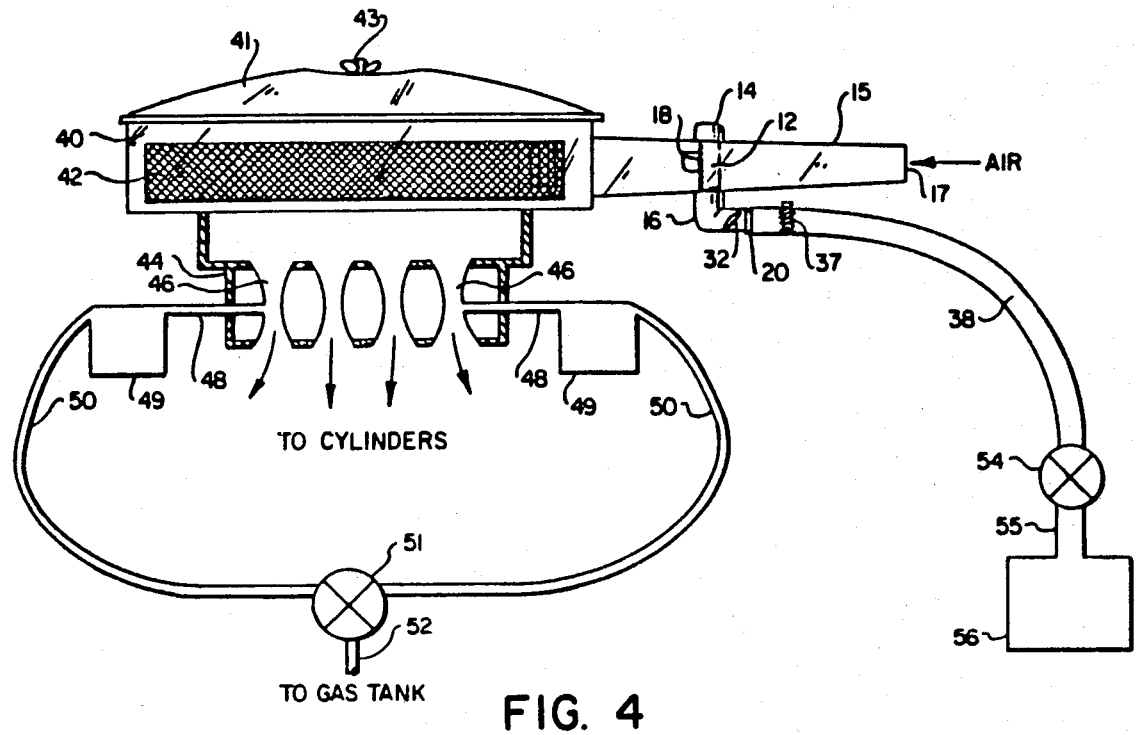
FIG. 4 is a schematic illustration of one presently preferred method of using the apparatus of the present invention in a dual fuel combustion engine.

The installation of the gaseous fuel mixer in the air intake system of an internal combustion engine is best viewed in FIG. 4. Although the gaseous fuel mixer illustrated in FIG. 4 corresponds to the embodiment of FIG. 3, the preferred embodiments of FIGS. 1 and 2 would be installed into the air intake system in an identical manner. The gaseous fuel mixer 13 is mounted to a snorkel 15 which is formed as an extension of an air filter housing 40 of the air intake system. Air filter housing 40 represents the air filter housing of any ordinary vehicle and has a lid 41 secured to the top thereof by a wing nut 43 as well as an air filter 42 disposed within the housing 40. Similarly, snorkel 15 represents the snorkel of any ordinary vehicle and has an inlet 17 for receiving incoming air.

Referring still to FIG. 4, the gaseous fuel mixer is installed into the air intake system by first drilling holes through the top and bottom surfaces of snorkel 15 which correspond to the diameter of second channel member 12. Cap 14 is mounted to second channel member 12 and the cap/channel member assembly is inserted into the top hole of snorkel 15 such that holes 18 face directly opposite snorkel inlet 17. First channel member 16 is screwed onto the end of second channel member 12 at threads 30 and positioned against the bottom surface of snorkel 15 to cooperate with cap 14 in securing second channel member 12 within the snorkel 15. It may also be desirable to apply a silicone compound around the base of cap 14 and first channel member 16 to provide a leakproof seal between the gaseous fuel mixer and snorkel 15. A gaseous fuel line 38 is inserted over the end of first channel member 16 and is secured in place by the ridges 20 formed at the end of first channel member 16. Gaseous fuel line 38 is additionally secured to first channel member 16 by a conventional screw clamp 37.

Figure 5:
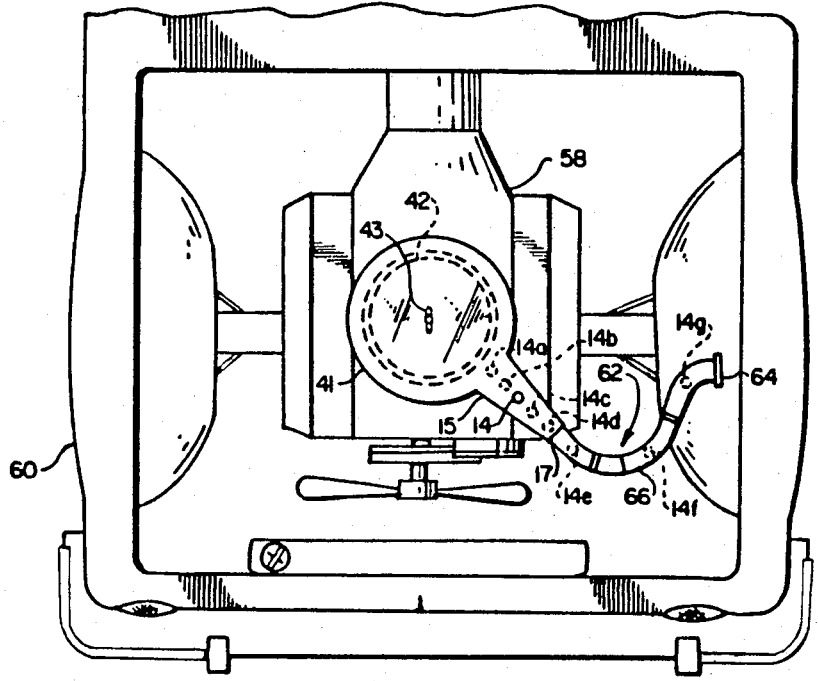
FIG. 5 is a top plan view of FIG. 4, showing the position of the installed gaseous fuel mixer and alternative installation positions in the air intake system.

Referring now to FIG. 5, the gaseous fuel mixer can be installed anywhere along the air intake conduit, generally designated 62, of the air intake system. The air intake conduit 62 includes snorkel 15 and a ram induction conduit 66 terminating at an air inlet 64. Ram induction conduit 66 is connected to snorkel 15 at snorkel inlet 17 so that air entering air inlet 64 passes through ram induction conduit 66, into snorkel 15, and subsequently into air filter housing 40.

The various possible installation positions for the gaseous fuel mixer are illustrated in FIG. 5 by the position of the cap 14 and alternative cap positions 14a–14g shown by dashed lines. Alternative cap position 14a represents positioning of the gaseous fuel mixer just inside air filter housing 40 but still before the air filter 42 shown in dashed lines. Alternative cap positions 14b, 14c, and 14d represent alternative positioning of the gaseous fuel mixer within snorkel 15. Alternative cap positions 14e, 14f, and 14g represent alternative positioning of the gaseous fuel mixer within the ram induction conduit 66. It will thus be apparent that the gaseous fuel mixer may be mounted to the air intake system at any position from air inlet 64 to air filter 42. The internal combustion engine 58 and vehicle body 60 are included to illustrate the environment of the system of the present invention.

One presently preferred method of using the gaseous fuel mixer is also understood by reference to FIG. 4. FIG. 4 schematically illustrates the dual fuel system for the internal combustion engine 58. The liquid gasoline fuel system and the gaseous fuel system can be used alone or in combination to operate the internal combustion engine 58.

The liquid gasoline fuel system illustrated in FIG. 4 is typical of the type of gasoline fuel systems used in most internal combustion engines. A gasoline carburetor 44 communicates with air filter housing 40 to receive incoming air after filtration by air filter 42. A plurality of venturies 46 are formed within carburetor 44 and provide passageways for the air which will be directed to each of the engine cylinders. Liquid gasoline from the gas tank is introduced into the venturies 46 through a liquid fuel line 52 that is connected through valve 51 to fuel lines 50. Fuel lines 50 lead to gasoline reservoirs 49 and fuel lines 48 leading to each of the venturies 46. As air is directed downward from air fliter housing 40 through venturies 46, liquid gasoline is introduced from gasoline fuel lines 48 into the venturies and mixed therewith for subsequent combustion in the cylinders. Valve 51 is installed between the gaseous fuel lines 52 and 50 to provide a means for selectively shutting off or opening up the flow of liquid gasoline from fuel line 52 into fuel lines 50.

The gaseous fuel system includes a conventional converter 56 for converting liquid fuel such as liquid propane to a gaseous state. It will be appreciated that any combustible gaseous fuel such as hydrogen gas, methane gas, natural gas, or the like, may be used with the gaseous fuel system and gaseous fuel mixer of the present invention. Converter 56 also includes a conventional diaphragm means (not shown) for introducing the gaseous fuel into a gaseous fuel line 55 at atmospheric pressure. A valve 54 is positioned between the gaseous fuel lines 55 and 38 to provide means for selectively shutting off or opening up the flow of gaseous fuel from gaseous fuel line 55 into gaseous fuel line 38.

With valve 54 in the open position, gaseous fuel is introduced through gaseous fuel line 55 into gaseous fuel line 38 and channel members 16 and 12. As incoming air flows through snorkel 15, it strikes the leading surface of second channel member 12 causing the air flow to be diverted around the second channel member 12. The air flowing past holes 18 creates a partial vacuum in the vicinity of holes 18. This vacuum is enhanced by the increasing cross-sectional configuration of snorkel 15, which is typical of the snorkels found in most vehicles. Since the air flowing through snorkel 15 is also near atmospheric pressure, the vacuum imposed around holes 18 results in a pressure differential between the gaseous fuel within second channel member 12 and the area within snorkel 15 immediately proximate to holes 18, thus drawing the gaseous fuel from second channel member 12 through holes 18 and into snorkel 15 to mix with the air flow.

The air entering air intake conduit 62 (see FIG. 5) through air inlet 64 is maintained at atmospheric pressure regardless of the speed of the vehicle by positioning air inlet 64 perpendicular to the line of movement of the vehicle 60. Thus, the rate of the air flow through air intake conduit 62 is determined solely by the demand of the engine cylinders. As the engine cylinders work harder and require more air, the air flow through snorkel 15 increases and the vacuum imposed around holes 18 increases proportionately, causing the gaseous fuel mixer to release a proportionately greater amount of gaseous fuel into the snorkel 15. Conversely, when the air demand of the engine is decreased, the vacuum imposed around holes 18 and the amount of fuel released into snorkel 15 decrease in proportion to the decrease in the air flow through snorkel 15. Thus, irrespective of the rate of the air flow through snorkel 15, the same gaseous fuel/air ratio is achieved by the gaseous fuel mixer.

Once it enters the snorkel 15, the gaseous fuel mixes with the air to form a combustible gaseous fuel/air mixture. To ensure that the optimum ratio of gaseous fuel to air is obtained for combustion, the flow of gaseous fuel through the gaseous fuel mixer is adjusted by turning handle 32 of stopcock 31 as described above.

The gaseous fuel/air mixture next enters air filter housing 40 where it is filtered by air filter 42 before passing into carburetor 44. Air filter 42 not only filters out foreign particles within the gaseous fuel/air mixture, but also mixes the gaseous fuel and air into a nearly perfect homogeneous mixture. This is thought to be due, in part, to the extremely small openings in air filter 42 through which the gaseous fuel and air must pass. By the time the gaseous fuel/air mixture passes through the carburetor 44 and into the cylinders of the internal combustion engine, the mixture of the gaseous fuel with the air is nearly perfect, with the result that all engine cylinders receive substantially the same ratio of gaseous fuel to air for subsequent combustion thereof. Thus, stopcock 31 can be adjusted so that each cylinder ultimately receives the optimum gaseous fuel/air mixture for combustion, resulting in exceptional fuel efficiency.

When the vehicle operator desires to operate the vehicle on liquid gasoline only, he turns valve 54 to the closed position and turns valve 51 to the open position. Conversely, if he wishes to operate the vehicle on gaseous fuel alone, he turns valve 51 to the closed position and valve 54 to the open position. Similarly, the vehicle can be operated by both fuel systems simultaneously, by turning both valves 51 and 54 to the open position.

Since the gaseous fuel mixer is installed into the air intake system before the air filter 42 where there is no congestion of engine parts, relatively easy installation of the gaseous fuel mixer can be accomplished. Moreover, installation into the air intake system is a quick and easy procedure, requiring no significant adaptation or modification of existing equipment. The same gaseous fuel mixer can be installed in virtually all vehicles. Additionally, no precision machining is needed to manufacture the gaseous fuel mixer, since any precise fuel flow rate can be achieved by simply adjusting the fuel flow regulator.

Because the gaseous fuel mixer is relatively small and mounted to the air intake system before the air filter 42, the gaseous fuel mixer does not disturb the existing air flow to any significant degree and the gaseous fuel travels a longer pathway before reaching the pistons and cylinders, thus giving the gaseous fuel and air plenty of time to mix homogeneously.

The gaseous fuel mixing system of the present invention provides for exceptionally smooth acceleration of the vehicle. Positioning the gaseous fuel mixer before the air filter 42 decreases the influence of the engine vacuum on the mixer during engine acceleration due primarily to (1) the relatively long pathway from the cylinders to the mixer; (2) the substantial air impedance between the cylinders and the mixer; and (3) the relatively large cross-sectional area of the air intake system where the mixer is positioned. Thus, being negligibly influenced by the engine vacuum, the gaseous fuel mixer maintains a constant gaseous fuel/air ratio irrespective of the air flow rate through the air intake system, even during engine acceleration.

The following fuel efficiency data was obtained from installation of one prototype of the gaseous fuel mixer in a 1980 Honda 1500 DX Civic (4 cylinders), operating on propane gas:

|  | Idle/Cruise | Full Throttle |
| --- | --- | --- |
| Air/Propane Fuel Ratio | 14.6/1 | 14.0/1 |
| Carbon Monoxide Emission | 0.5% | 1.60% |

Since the gaseous fuel/air ratio remains constant, no gaseous fuel is wasted during engine acceleration. Moreover, as the pistons and cylinders require more gaseous fuel/air mixture in response to engine acceleration, the increased demand is met immediately since there is plenty of gaseous fuel already mixed with air waiting to be combusted in the snorkel 15, the air filter housing 40, the carburetor 44, and all other locations within the engine between the gaseous fuel mixer and the engine cylinders. Because the engine can immediately begin to use this nearly perfectly mixed gaseous fuel/air reserve to begin acceleration of the engine, the gaseous fuel mixer has more than adequate time to replenish the gaseous fuel/air supply within the engine system, thus negating the instance of wasted fuel normally experienced during the air response delay. Moreover, this "reserve" of gaseous fuel/air mixture enables the engine to accelerate more quickly and smoothly.

Additionally, the mixing of the gaseous fuel with the incoming air is not affected by a dirty or wet air filter, or any other impedance of the air flow through the engine system. This is a consequence of positioning the gaseous fuel mixer within the air intake system before the air filter 42. If the air flow is impeded by a dirty air filter or other foreign substance, the gaseous fuel mixer automatically decreases the amount of gaseous fuel released into the air intake system to correspond to the decrease in air flow. Thus, even if the vehicle owner is negligent with regard to maintenance, the fuel efficiency of the vehicle will not be substantially affected.

Somewhat surprisingly, impedance of the air flow between the air filter 42 and the cylinders actually enhances the efficiency of the gaseous fuel mixer during engine acceleration. Impedance of the air flow between the air filter 42 and cylinders tends to reduce the effect of the engine vacuum imposed on the mixer during engine acceleration, thus making acceleration a smoother transition. The air filter 42 is especially a significant factor in retarding the increased air flow through the engine system caused by the engine vacuum during acceleration. Thus, positioning the gaseous fuel mixer before the air filter 42 helps to ensure that a constant gaseous fuel/air mixture is maintained.

Figure 6:
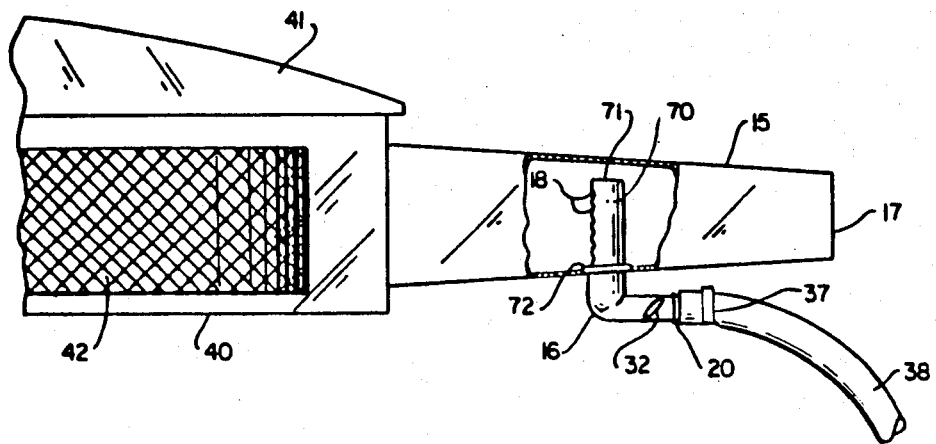
FIG. 6 is a partial cross-sectional view showing another preferred embodiment of the gaseous fuel mixer of the present invention installed within the snorkel of the air intake system of a combustion engine.

Another preferred embodiment of the gaseous fuel mixer is shown in FIG. 6. This preferred embodiment is similar to the preferred embodiment of FIG. 3, except that it has a second channel member 70 with a closed end 71 in lieu of a cap. This preferred embodiment of the gaseous fuel mixer is thus mounted to snorkel 15 by drilling a single hole in the bottom of the snorkel 15. Second channel member 70 is inserted through the hole so as to be disposed within snorkel 15 such that holes 18 face the air filter 52. The second channel member 70 is then threadingly mounted to first channel member 16 and secured to snorkel 15 by a securing nut 72. The preferred embodiment of FIG. 6 operates in substantially the same manner as the preferred embodiment of FIG. 3, the only important difference between the two preferred embodiments being the method of attachment to snorkel 15 and the method of closing the upper end of the second channel member.

Figure 7:
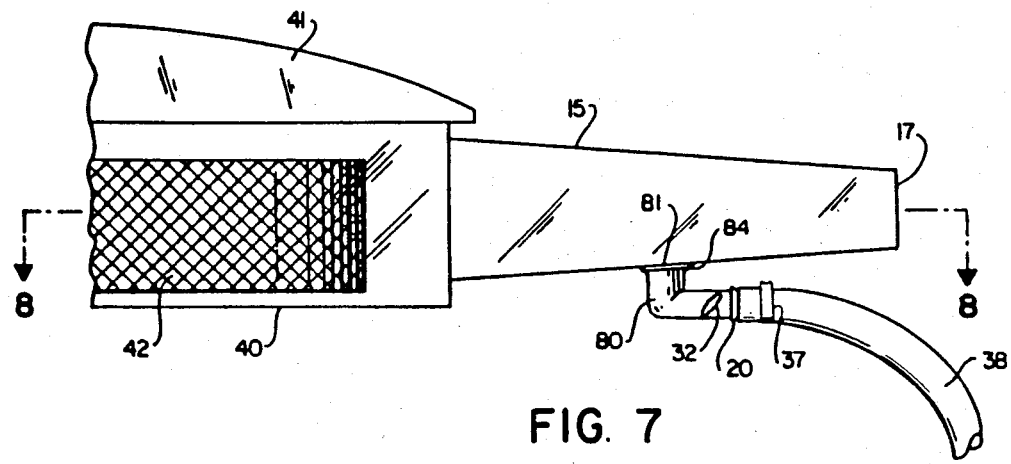
FIG. 7 is a partial cross-sectional view showing yet another preferred embodiment of the gaseous fuel mixer of the present invention mounted to the snorkel of the air intake system of an internal combustion engine.
Figure 8:
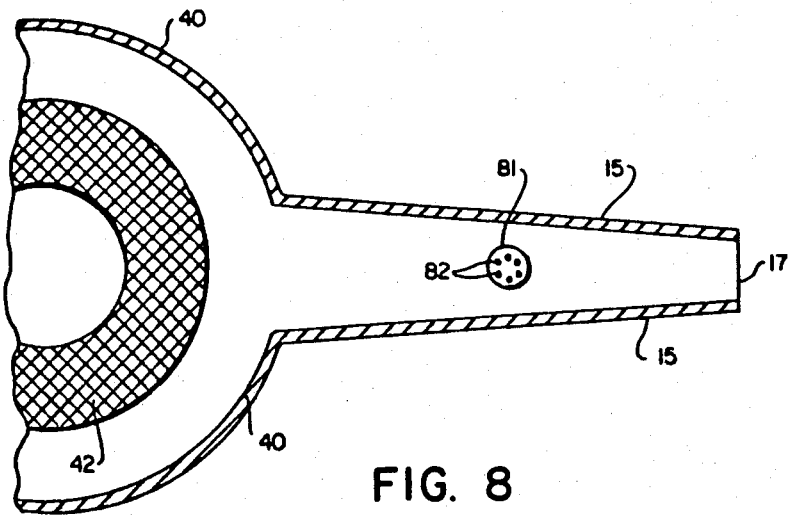
FIG. 8 is a cross-sectional view taken along line 8—8 of FIG. 7.

Still another preferred embodiment of the gaseous fuel mixer is shown in FIGS. 7 and 8. This preferred embodiment includes a single channel member 80 having a face 81 with a plurality of holes 82 formed therein. This preferred embodiment of the gaseous fuel mixer is mounted to the snorkel 15 by drilling a single hole in the bottom of the snorkel 15, positioning channel face 81 within the hole so as to be flush with the bottom surface of snorkel 15, and applying a ring of glue or sodder 84 around the channel 80 to secure channel 80 to the snorkel 15. Gaseous fuel is introduced into the channel 80 and flow of the gaseous fuel is regulated by turning stopcock handle 32 in a manner similar to that of the embodiment of FIG. 3. Holes 81 provide gaseous communication between snorkel 15 and channel 80 so that air flowing through snorkel 15 will impose a vacuum around holes 82 and draw the gaseous fuel through channel 80, out holes 82 and into the snorkel 15 to be mixed with the air therein.

The invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by U.S. Letters Patent is:

1. A method of mixing gaseous fuel with air for subsequent combustion in an internal combustion engine, comprising the steps of:
    obtaining a gaseous fuel from a fuel source at atmospheric pressure;
    drawing air through an air intake system of the internal combustion engine, the air intake system having an air inlet for receiving the air and an air intake conduit for transporting the air from the air inlet to an air filter; and
    introducing the gaseous fuel at atmosphereic pressure into the air intake system upstream from the air filter through a fluid channel mounted in the air intake conduit so as to allow the gaseous fuel to mix with the air passing through the air intake system and air filter.

2. A method as defined in claim 1 wherein the channel comprises an inlet for receiving the gaseous fuel and an outlet disposed within the air intake conduit for releasing the gaseous fuel into the air intake conduit.

3. A method as defined in claim 2 further comprising the step of regulating the flow of gaseous fuel through the channel.

4. A method as defined in claim 2 wherein the outlet of said fluid channel comprises a plurality of openings through which said gaseous fuel is admitted into said air intake conduit, and wherein said step of introducing said gaseous fuel comprises the step of positioning said openings such that the incoming air flowing past said openings will create a partial vacuum in the vicinity of said openings such that gaseous fuel will be sucked into the air intake conduit with the incoming air.

5. A method of mixing gaseous fuel with air as defined in claim 1 wherein the air received by the air inlet of the air intake system is at about atmospheric pressure.

6. A method of mixing gaseous fuel with air for subsequent combustion in an internal combustion engine, comprising the steps of:
    obtaining a gaseous fuel from a fuel source;
    mounting a channel to an air intake conduit of the internal combustion engine such that at least a portion of the channel is positioned within the air intake conduit, the channel having an inlet for receiving the gaseous fuel or atmospheric pressure and an outlet formed in the portion of the channel positioned within the air intake conduit, the outlet being oriented in the air intake conduit such that incoming air flowing past the outlet will create a partial vacuum in the vicinity of the outlet;
    introducing the gaseous fuel into the inlet of the channel;
    drawing the gaseous fuel through the channel and out the outlet into the air intake conduit by inducing an air flow through the air intake conduit;
    allowing the gaseous fuel to mix with the air within the air intake conduit; and
    passing the gaseous fuel/air mixture through an air filter so as to filter out foreign particles from the mixture and further mix the gaseous fuel with the air.

* * * * *